United States Patent
Nakajima et al.

[15] 3,663,943
[45] May 16, 1972

[54] AUTOMATIC VOLTAGE REGULATING SYSTEM FOR A DC LOAD

[72] Inventors: Tositaka Nakajima; Tomoyuki Okubo; Manabu Kobayashi; Kimio Yoshioka, all of Kawasaki-shi, Japan

[73] Assignee: Fuji Denki Seizo Kabushiki Kaisha, Kawasaki-shi, Japan

[22] Filed: Sept. 15, 1970

[21] Appl. No.: 72,729

[30] Foreign Application Priority Data

| Aug. 5, 1969 | Japan | 44/61925 |
| Aug. 5, 1969 | Japan | 44/61926 |
| Aug. 5, 1969 | Japan | 44/61927 |
| Mar. 20, 1970 | Japan | 45/23800 |
| Apr. 8, 1970 | Japan | 45/29886 |
| Apr. 20, 1970 | Japan | 45/33654 |
| May 25, 1970 | Japan | 45/44682 |

[52] U.S. Cl. ......321/18, 307/33, 321/47, 323/17, 323/22 SC, 323/24
[51] Int. Cl. ......H02m 7/20, G05f 1/64
[58] Field of Search......321/16, 18, 43, 46, 47; 323/4, 323/9, 17, 22 SC, 23, 24, 25, 22 SD; 307/33, 35

[56] References Cited

UNITED STATES PATENTS

| 3,504,265 | 3/1970 | Toulemonde | 321/16 X |
| 3,331,013 | 7/1967 | Cunningham | 323/22 SC |
| 3,495,154 | 2/1970 | Dosch | 323/22 SC X |
| 3,281,638 | 10/1966 | Crawford | 321/16 X |
| 3,242,416 | 3/1966 | White | 321/47 |
| 3,396,326 | 8/1968 | Kisrow | 323/9 |
| 3,262,045 | 7/1966 | Hauck | 321/16 |
| 3,235,787 | 2/1966 | Gordon et al. | 323/22 ZD |
| 3,535,615 | 10/1970 | Howell et al. | 323/22 SC |
| 3,492,560 | 1/1970 | Welsh | 321/47 X |

*Primary Examiner*—Gerald Goldberg
*Attorney*—Holman and Stern

[57] ABSTRACT

For automatic voltage regulation for a DC load, fed from an AC source via a three-terminal thyristor or a silicon-controlled rectifier, a constant-voltage element is connected in parallel to the AC source via a nonvariable resistance, and a capacitor is provided which is charged, via a variable resistance, with a voltage corresponding to a difference between the constant voltage of the aforesaid constant-voltage element and the voltage of the DC load, the voltage of said capacitor being impressed to the control terminals of the three-terminal thyristor, i.e., the gate and cathode terminals of the silicon-controlled rectifier, via a threshold-value element (e.g., a Shockley diode) that becomes conductive when the voltage of the capacitor reaches a predetermined threshold value.

4 Claims, 11 Drawing Figures

Patented May 16, 1972

AUTOMATIC VOLTAGE REGULATING SYSTEM FOR A DC LOAD

BACKGROUND OF THE INVENTION

This invention relates to an automatic voltage regulating system, and more specifically to an automatic voltage regulating system adapted to feed a DC load or DC loads from an AC source.

The supply of stabilized DC voltage from an AC source through a simple system is desirable for portable TV sets and, in regions with high voltage fluctuations, for home TV sets, various sound reproducing devices and the like. While a highly desirable supply circuit is certainly obtainable by employment of a method of constantly monitoring DC output voltage and, just as the voltage reaches a preset upper or lower limit, operating a voltage regulating means, such a supply circuit inevitably calls for an involved configuration and high manufacturing costs.

SUMMARY OF THE INVENTION

A primary object of the present invention, therefore, is to provide an automatic voltage regulating system for a DC load or DC loads, which has a simple circuit configuration and which is manufacturable at low costs.

Another object of the invention is to provide an automatic voltage regulating system for a DC load or DC loads, wherein fluctuation in DC output voltage caused by fluctuations in AC supply voltage is minimized.

These and the other ancillary objects are accomplished by the automatic voltage regulating system of the present invention, which is described hereinbelow according to its several preferred embodiments in connection with to the accompanying drawings throughout which like reference characters indicate like circuit constituents.

DETAILED DESCRIPTION OF THE INVENTION

Figure 1:
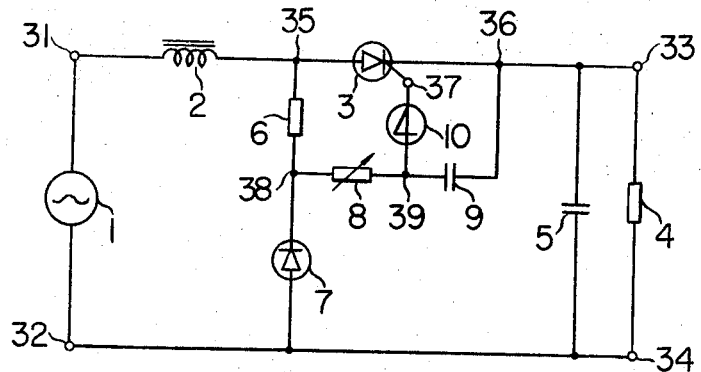
FIGS. 1 through 11 inclusive are circuit diagrams of the various examples of the automatic voltage regulating system all embodying the present invention.

Referring now to the drawings, and first of all to FIG. 1, a DC load 4 is connected to an AC source 1 (of 100 volts, for instance) through an anode-cathode path 35–36 and a current limiting impedance 2. The AC source 1 is connected to a series circuit of a nonvariable resistance 6 and a zener diode 7 (having a zener voltage of 40 volts, for instance). A series circuit of a variable resistance 8 and a capacitor 9 is connected in parallel between a cathode terminal 36 of a controlled rectifier 3 and connection point 38 between the nonvariable resistance 6 and the zener diode 7. A connection point 39 between the variable resistance 8 and the capacitor 9 is connected to a gate terminal 37 of the controlled rectifier 3 through a threshold value element 10 (e.g., a Shockley diode) which becomes conductive only when the voltage of the capacitor 9 reaches a predetermined threshold value. The DC load 4 is connected in parallel to a smoothing capacitor 5.

Prior to description on the operation of the present example of the voltage regulating system having the above described circuit configuration, let it be assumed that the DC output voltage is held at 12 volts. During the period when the voltage of the AC source 1 is forward polarized with respect to the controlled rectifier 3, there is produced between the point 38 and the point 36 a voltage of 28 volts that is a difference between the 40V zener voltage of the zener diode 7 and the 12V DC output voltage assumed above. The capacitor 9 is charged with the difference voltage of 28V at a time constant determined by its own capacity value and the resistance value possessed by the resistance 8. When the charging voltage of the capacitor 9 reaches the threshold voltage of the threshold value element 10, i.e., the breakdown voltage of the Shockley diode 10, the controlled rectifier 3 is fired. Although, due to this firing of the controlled rectifier 3, phase-controlled half-wave voltage appears at DC output terminals 33 and 34, a substantially constant DC voltage is delivered to the load 4 by virtue of the smoothing capacitor 5 and the current limiting impedance 2. If there are no fluctuations in either load impedance or AC supply voltage, the controlled rectifier 3 will always be fired at the above phase angle.

If the DC output voltage is lower than 12 volts, the aforesaid difference voltage produced between the points 38 and 36 increases correspondingly. As a result, the charging current of the capacitor 9 also increases, with the result that the period of time required for the capacitor 9 to be charged up to a voltage corresponding to the breakdown voltage of the Shockley diode 20 is shortened. The firing phase angle of the controlled rectifier 3 accordingly decreases, and the product of time and voltage led from the AC source 1 to the output circuit increases. (This product decreases when the DC output voltage is higher than 12 volts.) Hence, the half-wave voltage phase-controlled according to the DC output voltage is fed to the output circuit, so that DC output voltage fluctuations are kept low.

Since the potential of the point 38 is kept constant by means of the zener diode 7 regardless of fluctuations in the AC supply voltage, the firing phase angle remains unaltered even in the event of fluctuations in the AC supply voltage as long as the DC output voltage is kept at 12 volts. And, in case the DC output voltage does fluctuate even to the slightest degree due to fluctuations in the AC supply voltage, the firing phase angle changes so as to restrict those fluctuations in the DC output voltage.

Accordingly, if the above circuit elements are so designed that when the DC output voltage fluctuates 1 volt, for instance, from the desired value, the firing phase angle varies to a degree corresponding to 1 volt, the present voltage regulating system having the circuit configuration illustrated in FIG. 1 is capable of giving a substantially constant DC voltage to the load 4.

According to our experiments, when fluctuations of the AC input voltage were ±20 percent, with the AC input voltage set at 100 volts and the DC output voltage set at 11.7 volts; the corresponding fluctuations in the DC output voltage indicated were ±0.3 volts.

Figure 2:
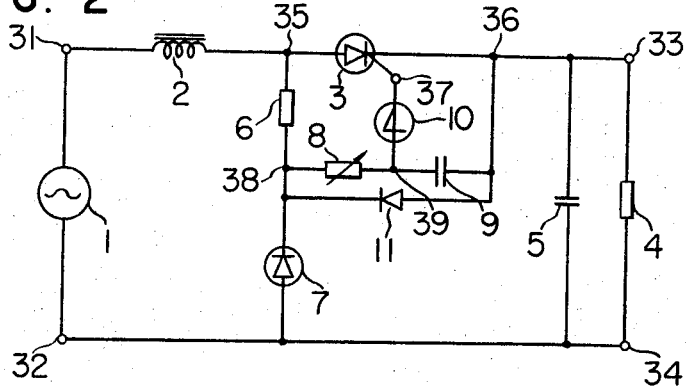

Although the current limiting impedance 2 is given as a reactor in FIG. 2, it may be replaced with a resistance when the load current is small, or it may be dispensed with altogether when the internal impedance of the AC source 1 is large enough. The smoothing capacitor 5, too, can be eliminated from the circuit when the load 4 is capacitive or has an inverse electromotive force. The threshold value element 10 also is not to be limited to the Shockley diode given in FIG. 1, but may be served by a bidirectionally conductive element (e.g., the one under the trademark "Diac"), a unijunction transistor or an ordinary transistor.

The foregoing descriptions on the circuit configuration and operation of the first embodiment of the invention illustrated in FIG. 1 basically holds true with the succeeding embodiments of FIGS. 2 through 11.

According to the circuit configuration of FIG. 2, the trouble can be eliminated, said trouble being involved in the adjustment of the time constant by means of a variable resistance 8 because a capacitor 9 is inversely charged during the half-cycle when the voltage of the AC source 1 is inversely polarized with respect to the controlled rectifier 3. For this purpose, a bypass diode 11 that is inversely polarized with respect to the controlled rectifier 3 is additionally connected in parallel to the series circuit of the variable resistance 8 and the capacitor 9. This bypass diode 11 can also be connected in parallel to only the capacitor 9 as in FIGS. 10 and 11.

Figure 3:
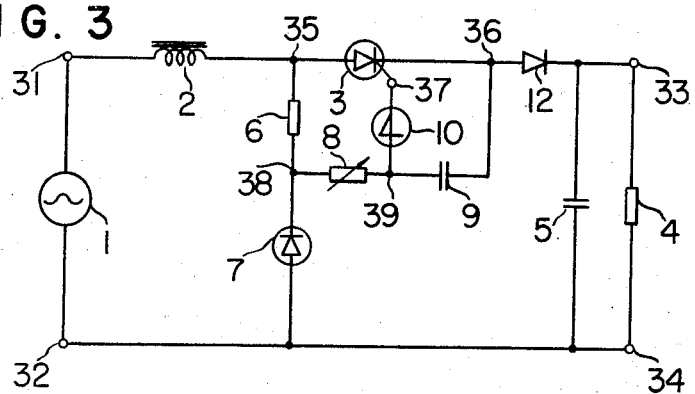
Figure 4:
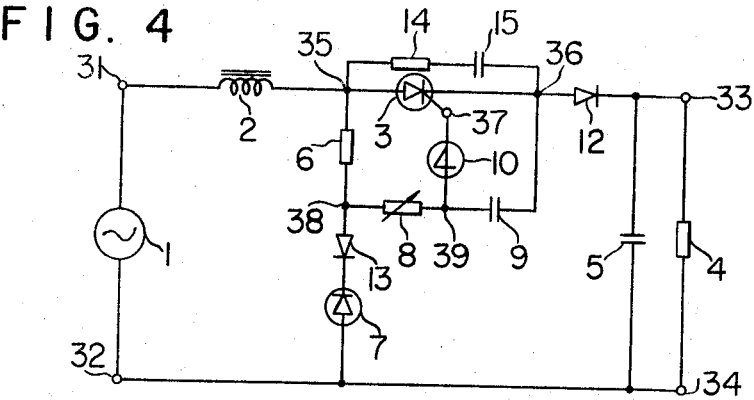

Further, for the same purpose of preventing the capacitor 9 from being inversely charged, an inverse current preventing diode 12 can be connected in series to an anode-cathode path 35–36 of the controlled rectifier 3 as in FIGS. 3 and 4.

Referring to FIG. 4, in which the controlled rectifier 3 is connected in parallel to a surge absorbing element consisting of a resistance 14 and a capacitor 15, it is desirable that another diode 13 be connected in series to a zener diode 7 in order to prevent the capacitor 9 from being charged with a current flowing through a closed circuit of AC source 1, zener diode 7, variable resistance 8, capacitor 9, capacitor 15, resistance 14, current limiting reactor 2 and AC source 1, during the half-cycle when the voltage of the AC source 1, is inversely polarized with respect to the controlled rectifier 3.

Figure 5:
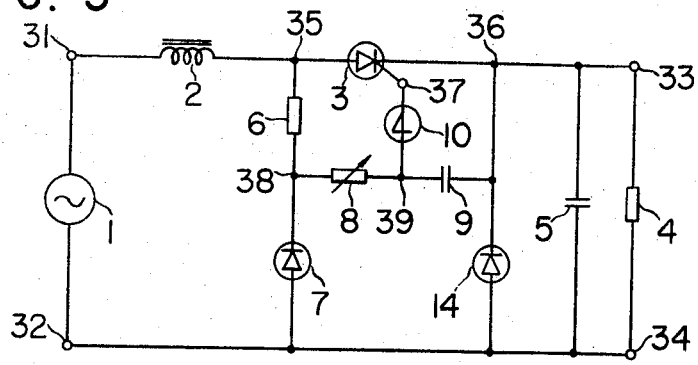
Figure 6:
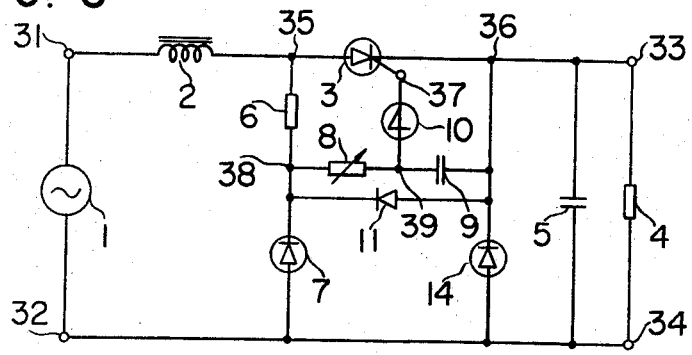
Figure 7:
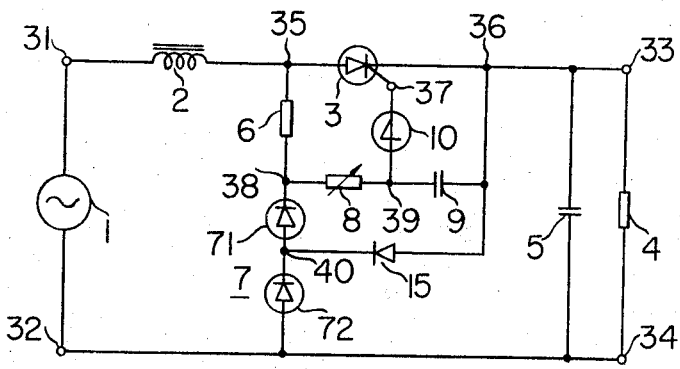

According to the further embodiments of the invention illustrated in FIGS. 5, 6 and 7, a temporary excessive rise in the DC output voltage in the event of a rapid fluctuation in the voltage of the AC source 1 can be prevented. For this purpose, a zener diode 14 having a zener voltage of 15 volts, for instance, is additionally connected in parallel to the load 4 in FIG. 5, corresponding to FIG. 1, and in FIG. 6, corresponding to FIG. 2. The embodiment of FIG. 7, on the other hand, makes use of the zener diode 7 connected to the AC source 1 via the nonvariable resistance 6, instead of an additional zener diode as in FIGS. 5 and 6, for the same purpose.

The mentioned zener diode 7 consists of a series circuit of a zener diode 71 having a zener voltage of 15 volts, for instance, and a zener diode 72 having a zener voltage of 25 volts, for instance; and a diode 15 is connected in parallel between the cathode terminal 36 of the controlled rectifier 3 and a connection point 40 between the zener diodes 71 and 72. In this manner, the diode 15 and zener diode 71 function in the same way as the zener diode 14 of FIG. 5 or 6, and the diode 15 and zener diode 72 function in the same way as the diode 11 of FIG. 2 or 6.

Figure 8:
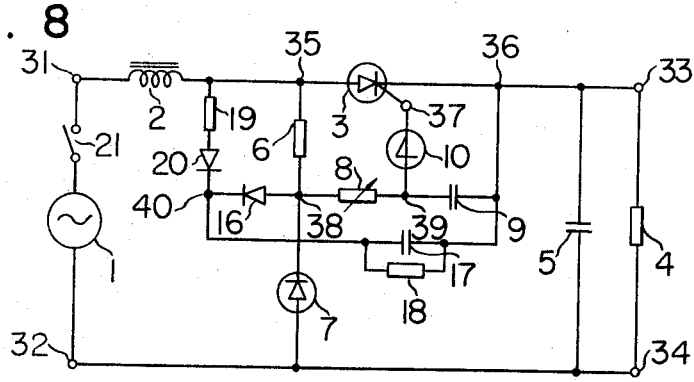

According to the embodiment of FIG. 8, the sudden flow of large current through the controlled rectifier 3 to charge the smoothing capacitor 5 when the circuit is actuated upon closure of a switch 21 can be prevented. To this end, there is provided an additional means whereby the voltage of the series circuit of the variable resistance 8 and the capacitor 9 is kept low only for an adequate length of time following the actuation of the entire circuit so that the firing phase angle of the controlled rectifier 3 is increased. That is, a series circuit of a diode 16 and another capacitor 17 is connected in parallel to the series circuit of the variable resistance 8 and the capacitor 9 as in the drawing. The capacitor 17 is further connected in parallel to a discharge resistance 18 for keeping the charge of the capacitor 17 zero in precedence of the actuation of the circuit. Further, in order to prevent the discharge of the capacitor 17 through the discharge resistance 18 to affect the firing phase angle during operation following the actuation of the circuit, there is provided an additional charging means for the capacitor 17, i.e., a series circuit of a resistance 19 and a diode 20 that is connected in parallel between the anode terminal 35 of the controlled rectifier 3 and a connection point 40 between the diode 16 and capacitor 17.

Upon closure of the switch 21, the capacitor 17 is charged by the AC source 1 via the resistance 6 and the diode 16, and the diode 16 is blocked at the moment when the sum voltage of the capacitor 17 and the smoothing capacitor 5 exceeds the zener voltage of the zener diode 7. Until the blocking of thid diode 16, the voltage of the zener diode 7 is held lower than its zener voltage. Accordingly, the voltage impressed to the series circuit of the variable resistance 8 and the capacitor 9 is held low at the time of actuation even when the DC output voltage is zero, so that the firing phase angle of the controlled rectifier 3 increases. Hence, at the time of actuation, the smoothing capacitor 5 is gradually charged little by little, whereby the mean current flowing through the controlled rectifier 3 can be held adequately small.

Figure 9:
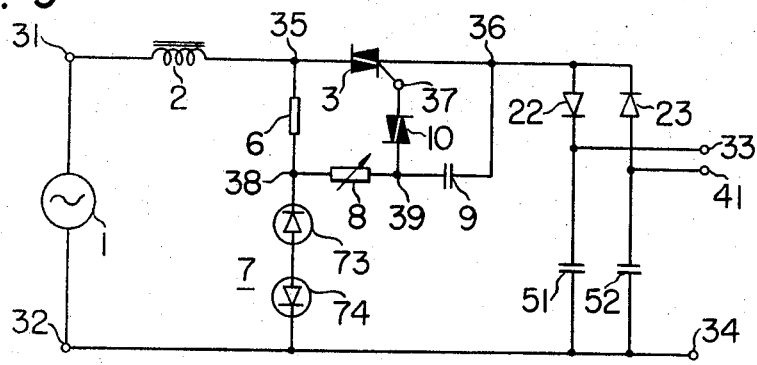

In the embodiment illustrated in FIG. 9, positive DC output and negative DC output can be obtained simultaneously from an output terminal 33 and an output terminal 34, respectively, with respect to a reference point 34. To this end, there is provided a bidirectional three-terminal thyristor 3 instead of the controlled rectifier 3, and the constant-voltage element 7 connected to the AC source 1 via the resistance 6 is here replaced by two zener diodes 73 and 74 which are connected in series in opposite polarities with each other. A threshold value element 20, connected between a connection point 39 between variable resistance 8 and capacitor 9 and the gate terminal 37 of the bidirectional three-terminal thyristor 8, has to be bidirectional. The function of this threshold-value element 10 can be fulfilled by a bidirectional two-terminal thyristor. Smoothing capacitors 51 and 52 are connected in parallel between the output terminals 33 and 34 and between the output terminals 41 and 34, respectively. Diodes 22 and 23 are disposed, in opposite polarities with respect to a terminal 36, in series connection between the mentioned terminal 36 of one of the electrodes of the bidirectional three-terminal thyristor 3 and the output terminals 33 and 41, respectively. In the above configuration, the capacitor 9 is charged, during the positive and negative half-cycles of the AC source 1, with the difference voltage between the zener voltage of the corresponding one of the zener diodes and the corresponding DC output voltage. During each half-cycle period, the threshold-value element 10 becomes conductive when the voltage of the capacitor 9 reaches a predetermined value to lead the striking current of arc for the bidirectional three-terminal thyristor 3 from the capacitor 9. The circuit of FIG. 9 operates essentially in the same way as that of FIG. 1.

Figure 10:
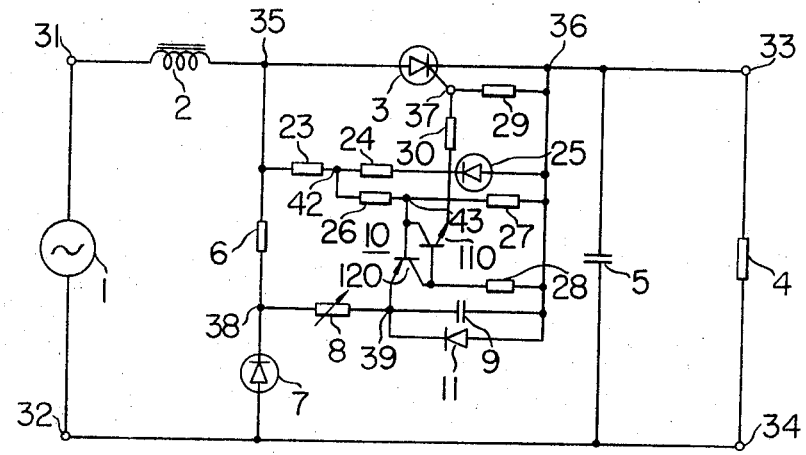
Figure 11:
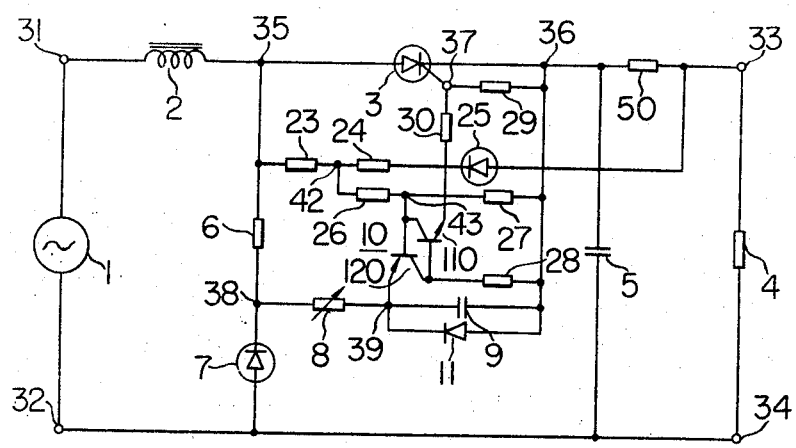

The still further embodiments of the invention illustrated in FIGS. 10 and 11 are capable of further reducing fluctuations in the DC output voltage caused by the voltage fluctuations of the AC source 1. There is provided for this purpose a switching element as the threshold value element 10 which is connected between the gate terminal 37 of the controlled rectifier 3 and the connection point 39 between variable resistance 8 and capacitor 9 and is brought in conductive state when the voltage of the capacitor 9 reaches its predetermined threshold value, said switching element being controllable in such a manner that the mentioned threshold value varies according to the voltage fluctuations of the AC source 1. This controllable switching element 10 may be composed of a PNP transistor 120 and an NPN transistor 110 as in the drawings. The transistor 120 has its emitter connected to a point 39, its collector to the base of the transistor 110 and its base to the collector of the transistor 110. The emitter of the transistor 110 is connected to the gate terminal 37 of the controlled rectifier 3 via a resistance 30. Resistances 28 and 29 serve for the stabilized operations of the transistors and controlled rectifier. A first potential divider comprising resistances 23 and 24 zener diode 25 is connected in parallel to the controlled rectifier 3. The voltage component separated from the resistance 24 and zener diode 25 of the first potential divider is applied to a second potential divider comprising two partial resistances 26 and 27. The voltage dividing point 43 of this second potential divider is connected to the common connection point of the base of the transistor 120 and the collector of the transistor 110. The voltage of the resistance 27 is in proportion to the sum of the voltage of the resistance 24 and the voltage of the zener diode 25. This sum of the voltage of the resistance 24 and the voltage of the zener diode 25 includes a constant voltage component and a voltage component proportional to the voltage obtained by subtracting DC output voltage from AC supply voltage. Since, generally, the DC output voltage is set considerably low in comparison with the AC supply voltage, it may be assumed that the sum of the voltage of the resistance 24 and the voltage of the zener diode 25 consists of a constant component and a component being substantially in proportion to the AC supply voltage. Consequently, the voltage of the resistance 27 contains, in the operating range, a constant component and a component being substantially in proportion to the supply voltage. The capacitor 9, on the other hand, is charged with the difference voltage between the voltage of the zener diode 7 and the DC output voltage, as described already.

The switching element 10 becomes conductive when the potential of the point 39 becomes higher than the potential at the point 43, i.e., when the voltage of the capacitor 9 becomes higher than the voltage of the resistance 27. Thus, the firing phase angle of the controlled rectifier 3 changes in response to supply voltage variation, too, growing that is, the firing phase angle becomes smaller with increase of the supply voltage and larger with decrease of said supply voltage, so that the output circuit can be supplied with the voltage-time product optimum for the value of its DC output voltage at each moment. In this manner, fluctuations in the DC output voltage due to fluctuations in the supply voltage are minimized.

There is a further cause for DC output voltage fluctuations, i.e., fluctuations in load impedance and, therefore, in load current. This cause is eliminated to some extent in the embodiment of FIG. 11, in which a small resistance 50 is connected in series to the load 4 on its cathode-terminal side of the controlled rectifier 3. The first potential divider comprising the resistances 23 and 24 and zener diode 25 is connected in parallel to the series circuit of the aforesaid resistance 50 and the anode-cathode path of the controlled rectifier 3. Accordingly, the voltage impressed to the second potential divider comprising the resistances 26 and 27 is a difference obtained by subtracting the voltage of the resistance 50 from the sum of the voltages of resistance 24 and zener diode 25, so that the voltage obtained from both sides of the resistance 27 contains a constant component, a component being substantially in proportion to the supply voltage and a component being substantially in inverse proportion to the load current. Thus, the firing phase angle decreases with increase of the load current and increases with decrease of said load current, so that the output circuit can be supplied with the optimum voltage-time product according to the load condition at each moment. In this manner, the output voltage fluctuations caused by supply voltage fluctuations and by changing load conditions are minimized by the circuit configuration of FIG. 11.

It is to be noted that the certain preferred embodiments of the invention shown and described in the foregoing are merely by way of example and any modification may be made within obvious range.

We claim:

1. An automatic voltage regulating apparatus adapted to feed a DC load from an arc power source, which comprises
    a first series circuit composed of a nonvariable resistor and a first constant voltage element, said series circuit being connected in parallel to said AC source;
    a control rectifier having first and second main electrodes and a gate electrode, said first main electrode being connected to one terminal of said AC source;
    circuit means for connecting said second main electrode with one terminal of said DC load;
    a second series circuit composed of a variable resistor and a capacitor, said second series circuit being connected in parallel between both main electrodes of said control rectifier through said nonvariable resistor;
    a third series circuit composed of two resistors and a second constant voltage element, said series circuit being connected in parallel between both main electrodes of said control rectifier;
    a potential divider for taking out a partial voltage which is in proportion to sum of the terminal voltage of one of said two resistors and terminal voltage of said second constant voltage element; and
    a switching element capable of being controlled, said element being adapted to apply the terminal voltage of said capacitor to the gate electrode of said control rectifier upon increase of said terminal voltage above said partial voltage.

2. An automatic voltage regulating apparatus adapted to feed a DC load from an AC source; which comprises
    a first series circuit composed of a nonvariable resistor and a first constant voltage element, said series circuit being connected in parallel to said AC power source;
    a control rectifier having first and second main electrodes and a gate electrode said first main electrode being connected to one terminal of said AC source;
    a resistor connected between said second main electrode and one terminal of said DC load and adapted to take out a voltage being in proportion to load current of said DC load;
    circuit means for connecting another terminal of said AC power source and another terminal of said DC load;
    a second series circuit composed of a variable resistor and a capacitor, said series circuit being connected in parallel between both main electrodes of said control rectifier through said nonvariable resistor;
    a third series circuit composed of the other two resistors and a second constant voltage element, said third seris circuit being connected between said first main electrode and one terminal of said DC load;
    a potential divider for taking out a partial voltage being in proportion to a voltage obtained by subtracting the terminal voltage of one of said other two resistors from the sum of terminal voltage of said second constant voltage element and terminal voltage of said one resistor; and
    a switching element capable of being controlled, said element being adapted to apply the terminal voltage of said capacitor to said gate electrode of said control rectifier upon increase of said terminal voltage above said partial voltage.

3. An automatic voltage regulating system adapted to feed a DC load from an AC source, which comprises;
    a first series circuit composed of a non-variable resistor and a constant voltage element which are connected in parallel to said AC source, said constant voltage element being composed of two partial constant voltage elements;
    a control rectifier having first and second main electrodes and a gate electrode, said first main electrode being connected to one terminal of said AC source;
    circuit means for connecting said second main electrode with one terminal of said DC load;
    another circuit means for connecting the other terminal of said AC source with the other terminal of said DC load;
    a second series circuit composed of a variable resistor and a first capacitor, said second series circuit being connected in parallel between said main electrodes of said control rectifier through said non-variable resistor;
    a threshold element adapted to apply the voltage of said capacitor to the gate electrode of said control rectifier upon reaching of said voltage to a predetermined value; and
    a diode connected between a common connection point of said partial constant voltage elements and said one terminal of said DC load.

4. An automatic voltage regulating system adapted to feed a DC load from an AC source, which comprises;
    a first series circuit composed of a non-variable resistor and a constant voltage element which are connected in parallel to said AC source;
    a control rectifier having first and second main electrodes and a gate electrode, said first main electrode being connected to one terminal of said AC source;
    circuit means for connecting said second main electrode with one terminal of said DC load;
    another circuit means for connecting the other terminal of said AC source with the other terminal of said DC load;
    a second series circuit composed of a variable resistor and a first capacitor, said second series circuit being connected in parallel between said main electrodes of said control rectifier through said non-variable resistor;
    a threshold element adapted to apply the voltage of said capacitor to the gate electrode of said control rectifier upon reaching of said voltage to a predetermined value;
    a third series circuit composed of a diode and a second capacitor, said third series circuit being connected in parallel to said second series circuit;

a resistor connected in parallel to said second capacitor; and a fourth series circuit which is composed of another resistor and diode, said fourth series circuit being connected between a common connection point of the diode and said second capacitor and one terminal of the AC source.

* * * * *